Feb. 21, 1950   P. S. WOITOVITCH   2,498,058
PHOTOGRAPHIC FILM HOLDER FOR USE IN DEVELOPING
Filed May 21, 1947
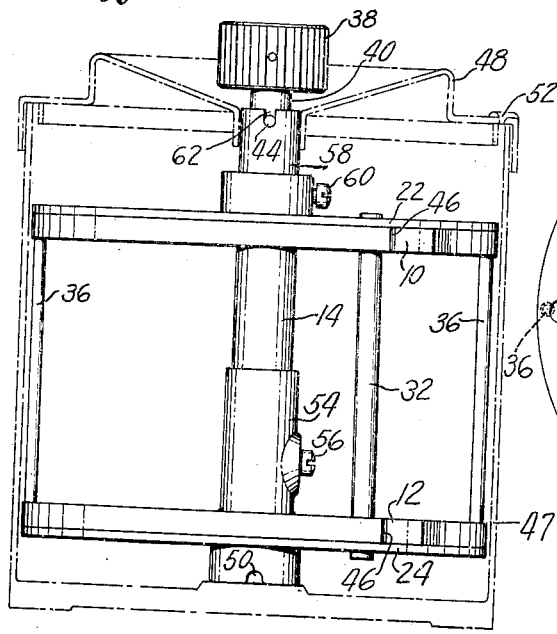
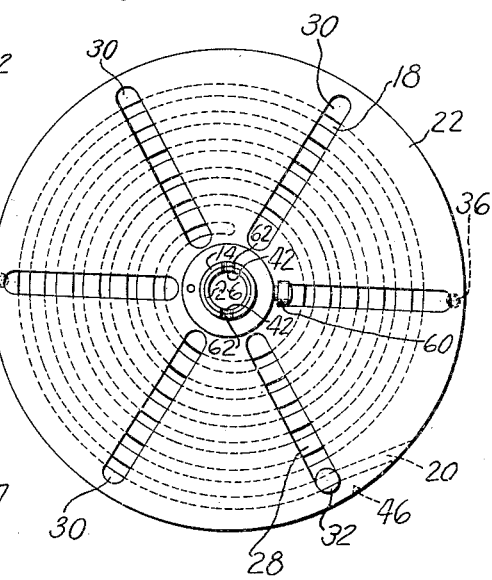
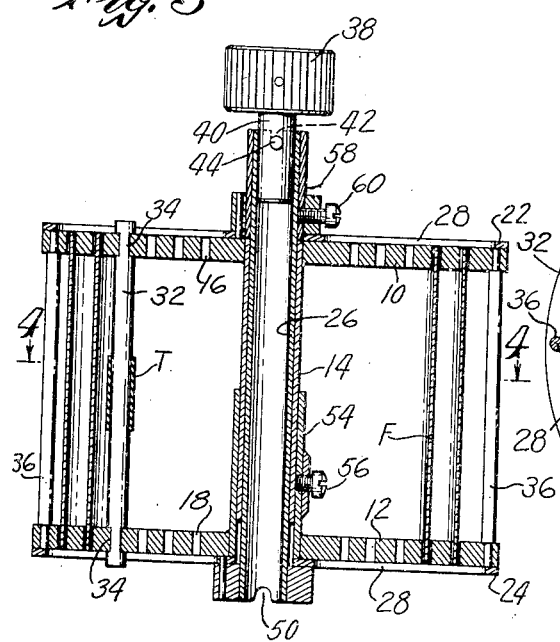
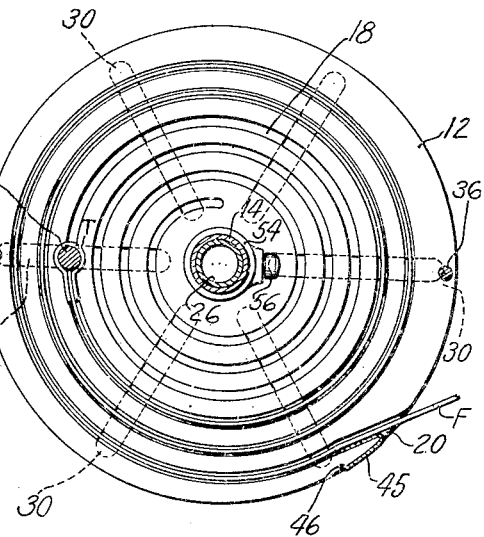
INVENTOR
Peter S. Woitovitch
BY S. Jay Teller
ATTORNEY Patented Feb. 21, 1950

2,498,058

UNITED STATES PATENT OFFICE 2,498,058

PHOTOGRAPHIC FILM HOLDER FOR USE IN DEVELOPING

Peter S. Woitovitch, Windsor, Conn.

Application May 21, 1947, Serial No. 749,586

12 Claims. (Cl. 242—77)

The invention relates to a photographic film holder for use during development of the film, the holder being ordinarily adapted to be used in a developing tank which is or may be of conventional construction.

Film holders of the type to which the invention relates have commonly been provided with two parallel discs or plates having registering spiral slots in their inner faces. With such a film holder it has been necessary to manually push the strip of film endwise into the spiral grooves and this could be accomplished only with considerable difficulty. Even a small amount of moisture in the slots would interfere with the movement of the film, and it was difficult to avoid crumpling the film, or making finger marks thereon, or otherwise damaging it.

It has heretofore been proposed to provide a film holder with means engageable with the front end of a film and movable in a spiral path to draw the film into spiral slots or into a spiral channel. However, the devices heretofore proposed for this purpose have been complicated and expensive and have had various disadvantages. The principal object of the present invention is to provide a film holder which has means for engaging the film to draw it into position and which is simple and can be manufactured at low cost, the holder preferably constituting a self-contained unit adapted to be used in developing tanks of conventional design.

Other and more specific objects of the invention will be apparent from the drawing and from the following specification and claims.

In the drawing I have shown in detail a preferred embodiment of the invention, but it will be understood that various changes may be made from the construction shown, and that the drawing is not to be construed as defining or limiting the scope of the invention, the claims forming a part of this specification being relied upon for that purpose.

Of the drawing,

Fig. 1 is a side view of a film holder embodying the invention, this view also showing in dot-and-dash lines a developing tank with which the film holder may be used.

Fig. 2 is a plan view of the film holder as shown in Fig. 1, the tank and the manually engageable knob of the holder being omitted.

Fig. 3 is a vertical sectional view of the film holder, this view showing the parts in different relative positions and showing a film partly drawn into position.

Fig. 4 is a horizontal sectional view taken along the line 4—4 of Fig. 3, this view showing the film in elevation and showing an optionally usable film guide which is omitted in the other figures.

Referring to the drawing, 10 and 12 represent two similar parallel inner discs or disc-like members which are in spaced relationship with each other, these discs being connected with a central tube 14 which holds them in their spaced relationship and prevents relative rotation. Preferably, as hereinafter explained, one of the discs is connected with the tube 14 indirectly, rather than directly. The discs 10 and 12 are provided respectively with spiral slots 16 and 18 which are similar in size and shape and which are in longitudinal register with each other. The slots are narrow and extend completely through the discs. The outer ends of the spiral slots are at the periphery of the discs and their inner ends are closed and are near the centers of the discs. Preferably, the extreme outer end of each slot is inclined outward, as indicated at 20, so as to provide a more favorable angular relationship between the end of the slot and the periphery of the disc.

Two similar parallel outer discs or disc-like members 22 and 24 are provided, these being closely adjacent the outer faces of the inner discs 10 and 12. A core member 26 extends through the center tube 14 and the discs 22 and 24 are connected with the core member which holds them in fixed relationship with each other. Preferably, as hereinafter explained, one of the last said discs is connected with the core member 26 indirectly, rather than directly. Preferably, the core member is a tube which may be open at both ends. It will be seen that the discs 22 and 24 and the core member 26 are rotatable with respect to the discs 10 and 12 and the tube 14.

The discs 22 and 24 are provided respectively with two radial slots 28, 28, the two slots being similar in size and shape and being in longitudinal register with each other. In addition to the radial slots 28, 28, the discs 22 and 24 are preferably provided with other openings 30, 30 which may also be radial slots arranged in longitudinally registering pairs. As shown, the slots 30, 30 are similar to the slots 28, 28, all of the slots in each disc being equally spaced.

A longitudinal rod 32 is provided which extends through the spiral slots 16 and 18 in the discs 10 and 12 and which also extends into the two radial slots 28, 28 in the discs 22 and 24. Preferably, and as shown, the rod 32 is generally cylindrical, but it has two reduced portions 34, 34 which have flat sides, these reduced portions being adapted to approximately fit the spiral slots 16 and 18. The shoulders at the ends of the reduced portions 34, 34 engage the faces of the discs 10 and 12 to prevent endwise movement of the rod.

It will be seen that if the rod 32 is initially in the position shown in Fig. 2, it will, upon relative rotation of the discs 22 and 24 in the clockwise direction, travel inward along the spiral slots 16 and 18 until it reaches the inner ends of the said slots. When the discs 22 and 24 are relatively rotated in the counterclockwise direction, the rod 32 will move outward along the spiral slots 16 and 18 to its initial position as shown in Fig. 2. As shown in Fig. 2, the rod 32 is at the outer ends of the slots 28, 28, and is also at the outward inclined portions 20 of the slots 16 and 18. This prevents any movement of the rod 32 in the counterclockwise direction beyond the position shown.

Two or more longitudinal tie rods 36, 36 are preferably provided which are connected at their ends with the discs 10 and 12 near the peripheries thereof. As shown, the tie rods have reduced end portions which extend into apertures in the discs, and they are freely removable when the discs are separated. These rods 36, 36 are primarily useful to assist in manually holding the discs 10 and 12 in stationary positions while the discs 22 and 24 are being rotated relatively thereto. Preferably, a manually engageable knob 38 is provided which is connectible with the core member 26, this rod serving as a convenient means for relatively rotating the discs 22 and 24. The knob 38 is preferably detachable and it is provided with a stud 40 which fits into the hollow core member 26. The core member has at least one notch 42 and preferably has two such notches which are opposite and the stud 40 is provided with a pin or pins 44 adapted to enter the notch or notches 42. Thus the knob 38 can be used for turning the core member and the discs 22 and 24, but it is readily detachable from the core member when necessary.

The discs 10 and 12 are so spaced that the distance between their outer faces is slightly greater than the width of the film F to be introduced into the holder. With the rod 32 in its outermost position, as shown in Fig. 2, the end of the film is inserted into the outer ends of the slots 16 and 18 and is attached to the said rod. The end of the film may be attached to the rod by a small piece of adhesive tape, as indicated at T in Figs. 3 and 4, or a suitable clamping device may be provided to be used in lieu of the tape. With the end of the film inserted in the slots and attached to the rod 32, the discs 10 and 12 are held stationary as for instance by grasping the rods 36, 36 and then the discs 22 and 24 are relatively turned in the clockwise direction, as for instance by means of the knob 38. As already stated, this turning movement causes the rod 32 to travel inward along the spiral slots 16 and 18 and in so doing it carries the film with it, the film being thus positioned between the outer discs 22 and 24 and with its edges in the spiral slots in the inner discs 10 and 12. Figs. 3 and 4 show the film partly drawn into position and it will be apparent that continued movement of the rod 32 in the clockwise direction will draw the film completely into the slots. The total length of the slots is at least as great as the total length of the film.

A removable film guide 45 may be provided as shown in Fig. 4, but omitted in the other figures. When in use this film guide extends longitudinally between the discs 10 and 12 and is located at the outer ends of the spiral slots 16 and 18. The guide serves to prevent any transverse outward bending of the film as it passes into the slots. The guide 45 is formed of sheet metal and may be readily snapped in place or removed. When in place it is held by integral detents thereon which enter notches 46, 46 in the edges of the discs 10 and 12. It will be understood that the guide 45 is optionally usable and may be entirely omitted if desired.

When the film has been drawn into the holder as described, the holder is placed in a cylindrical tank such as 47, this tank having a cover 48. The tank and the cover may be of conventional construction and do not of themselves constitute a part of the present invention. The cover 48 has an aperture at the top for registering with the upper end of the hollow core member 26, it being understood that the knob 38 is removed before the cover is put in place. With the cover in place a suitable quantity of developing liquid is poured into the tank through the hollow core member 26, the core member being provided with notches 50 at the bottom to permit the liquid to freely flow into the tank. After the developing liquid has been introduced into the tank, the knob 38 is put in place as shown in Fig. 1 and this can then be used to oscillate the entire holder within the tank so as to agitate the developing liquid and circulate it with respect to the film. The slots 28, 28 and 30, 30 in the outer discs permit the liquid to flow freely through the outer discs and thence through the spiral slots 16 and 18 in the inner discs and into contact with the film.

After the film has been developed the developing liquid can be poured out through an aperture 52 in the cover 48 and upon removing the knob 38 a fixing solution can be introduced into the tank in the same manner as already described in connection with the developing liquid.

Upon the completion of developing and fixing, the holder is removed from the tank and the film is removed from the holder by reversing the procedure already described, the outer discs 22 and 24 and the rod 32 being relatively rotated in the counterclockwise direction. Removal of the film will be facilitated by applying tension to the outer end thereof.

Provision is preferably made for adjusting the holder so that is can be used with films of different widths. The spacing between the discs 10 and 12 and between the discs 22 and 24 can be increased or decreased and the rods 32 and 36, 36 can be replaced by other similar rods which are longer or shorter.

In order that the spacing between the inner discs 10 and 12 may be changed, the effective length of the connecting tube 14 may be changed. As shown, the disc 12 is connected with a sleeve 54 which is longitudinally slidable on the tube 14 and which can be secured in adjusted position by means of a screw 56. The sleeve 54 and the screw 56 serve to connect the disc 12 with the tube 14. In order that the spacing between the outer discs 22 and 24 may be similarly changed, one of the said discs, as for instance the disc 22, is connected with the hollow core member 26 by means of a sleeve 58 which can be held in adjusted position by means of a screw 60. The sleeve 58 and the screw 60 serve to connect the disc 22 with the core 26.

The sleeve 58 has at least one notch 62 and preferably has two such notches which are opposite.

The notch or notches 62 in the sleeve are similar to the notch or notches 42 in the core member, being adapted to also receive the pin or pins 44 on the stud 40. When the parts are in the positions shown in the drawing, the notches 62, 62 are in register with the notches 42, 42 and the pins 44 enter all of the notches. However, if the sleeve 58 is moved downward for a narrower film, the pins 44 will enter only the notches 42, 42. If the sleeve 58 is moved upward for a wider film, the pins 44 will enter only the notches 62, 62.

What I claim is:

1. A film holder for use in a developing tank comprising in combination, two spaced similar inner discs provided with similar spiral slots in longitudinal register with each other and extending inward from the disc peripheries, a central longitudinal tube connecting the inner discs to hold them in fixed relationship, two similar outer discs adjacent the outer faces of the inner discs and provided respectively with two similar radial slots constituting a pair of such slots in longitudinal register with each other, a core member extending through the central tube and connected with the outer discs to hold them in fixed relationship, and a longitudinal rod extending through the spiral slots in the inner discs and into the radial slots in the outer discs, the said rod in its outermost position being adapted for the attachment thereto of the end of a film and the said rod upon relative rotation of the outer and inner discs being movable inward along the spiral slots in the inner discs so as to carry the film with it and so as to position the film between the outer discs and with its edges in the spiral slots in the inner discs.

2. A film holder as set forth in claim 1, wherein the longitudinal rod has shoulders engaging faces of the inner discs to prevent endwise movement of the rod.

3. A film holder as set forth in claim 1, wherein the longitudinal rod is generally cylindrical but has relatively thin flat sided portions which extend through and approximately fit the spiral slots in the inner discs.

4. A film holder as set forth in claim 1, wherein the outer discs have slots therein additional to the two said slots into which the rod extends, all of the said slots in the outer discs cooperating with the said spiral slots in the inner disc to facilitate the flow of developing liquid into engagement with the film.

5. A film holder as set forth in claim 1, wherein the outer discs respectively have pluralities of similar radial slots therein arranged in a plurality of registering pairs, and wherein the longitudinal rod extends into the slots of one of the pairs.

6. A film holder for use in a developing tank comprising in combination, two spaced similar inner discs provided with similar spiral slots in longitudinal register with each other and extending inward from the disc peripheries, a central longitudinal tube connecting the inner discs to hold them in fixed relationship, two similar outer discs adjacent the outer faces of the inner discs and provided with two similar radial slots in longitudinal register with each other, a core member extending through the central tube and connected with the outer discs to hold them in fixed relationship, longitudinal tie rods connecting the inner discs near their peripheries and adapted to be manually engaged to prevent rotation of the said inner discs, and a longitudinal rod extending through the spiral slots in the inner discs and into the radial slots in the outer discs, the said rod in its outermost position being adapted for the attachment thereto of the end of a film and the said rod upon rotation of the outer discs relative to the inner discs being movable inward along the spiral slots in the inner discs so as to carry the film with it and so as to position the film between the outer discs and with its edges in the spiral slots in the inner discs.

7. A film holder for use in a developing tank comprising in combination, two spaced similar inner discs provided with similar spiral slots in longitudinal register with each other and extending inward from the disc peripheries, a central longitudinal tube connecting the inner discs to hold them in fixed relationship, two similar outer discs adjacent the outer faces of the inner discs and provided with two similar radial slots in longitudinal register with each other, a core member extending through the central tube and connected with the outer discs to hold them in fixed relationship, longitudinal tie rods connecting the inner discs near their peripheries and adapted to be manually engaged to prevent rotation of the said inner discs, a manually engageable knob connected with the core member and serving for rotating the outer discs relatively to the inner discs, and a longitudinal rod extending through the spiral slots in the inner discs and into the radial slots in the outer discs, the said rod in its outermost position being adapted for the attachment thereto of the end of a film and the said rod upon rotation of the outer discs by the said knob being movable inward along the spiral slots in the inner discs so as to carry the film with it and so as to position the film between the outer discs and with its edges in the spiral slots in the inner discs.

8. A film holder for use in a developing tank having a cover, which film holder comprises in combination, two spaced similar inner discs provided with similar spiral slots in longitudinal register with each other and extending inward from the disc peripheries, a central longitudinal tube connecting the inner discs to hold them in fixed relationship, two similar outer discs adjacent the outer faces of the inner discs and provided with two similar radial slots in longitudinal register with each other, a hollow core member extending through the central tube and connected with the outer discs to hold them in fixed relationship, the said hollow core being adapted to register with an opening in the tank cover for the reception of developing liquid, and a longitudinal rod extending through the spiral slots in the inner discs and into the radial slots in the outer discs, the said rod in its outermost position being adapted for the attachment thereto of the end of a film and the said rod upon relative rotation of the outer and inner discs being moved inward along the spiral slots in the inner discs so as to carry the film with it and so as to position the film between the outer discs and with its edges in the spiral slots in the inner discs.

9. A film holder as set forth in claim 8, having a manually engageable knob connectible with the hollow core member, the said knob being adapted for rotating the outer discs relatively to the inner discs and also for oscillating the entire holder when it is in place in the tank and the said knob being detachable from the hollow core member to permit liquid to enter.

10. A film holder for use in a developing tank comprising in combination, two spaced similar inner discs provided with similar spiral slots in longitudinal register with each other and extending inward from the disc peripheries, a central longitudinal tube connecting the inner discs to hold them in fixed relationship, the said tube being adjustable in length to permit the spacing between the said inner discs to be changed in accordance with the width of the film, two similar outer discs adjacent the outer faces of the inner discs and provided with two similar radial slots in longitudinal register with each other, a core member extending through the central tube and connected with the outer discs to hold them in fixed relationship, the said core member being adjustably connected with one of the last said discs to permit the spacing between them to be changed in accordance with the change in spacing of the inner discs, and a longitudinal rod extending through the spiral slots in the inner discs and into the radial slots in the outer discs, the said rod in its outermost position being adapted for the attachment thereto of the end of a film and the said rod upon relative rotation of the outer and inner discs being movable inward along the spiral slots in the inner discs so as to carry the film with it and so as to position the film between the outer discs and with its edges in the spiral slots in the inner discs.

11. A film holder as set forth in claim 10, wherein the core member is hollow and has a notch therein at one end, wherein the outer disc adjacent the notched end of the core member is connected with the said core member by a sleeve having a notch in the end thereof, and wherein there is a manually engageable knob having a stud adapted to enter the end of the core member, the said stud having a projection thereon adapted to enter the notch in the core member or to enter the notch in the sleeve or to enter both notches.

12. A film holder for use in a developing tank comprising in combination, two spaced similar inner discs provided with similar spiral slots in longitudinal register with each other and extending inward from the disc peripheries, a central longitudinal tube connecting the inner discs to hold them in fixed relationship, two similar outer discs adjacent the outer faces of the inner discs and provided with two similar radial slots in longitudinal register with each other, a core member extending through the central tube and connected with the outer discs to hold them in fixed relationship, a longitudinal rod extending through the spiral slots in the inner discs and into the radial slots in the outer discs, the said rod in its outermost position being adapted for the attachment thereto of the end of a film and the said rod upon relative rotation of the outer and inner discs being movable inward along the spiral slots in the inner discs so as to carry the film with it and so as to position the film between the outer discs and with its edges in the spiral slots in the inner discs, and a longitudinal film guide extending between the inner discs adjacent the outer ends of the spiral slots therein.

PETER S. WOITOVITCH.

REFERENCES CITED

The following references are of record in the file of this patent:

UNITED STATES PATENTS

| Number | Name | Date |
|---|---|---|
| 1,615,880 | Lucas | Feb. 1, 1927 |
| 2,232,763 | Becher | Feb. 25, 1941 |